UNITED STATES PATENT OFFICE.

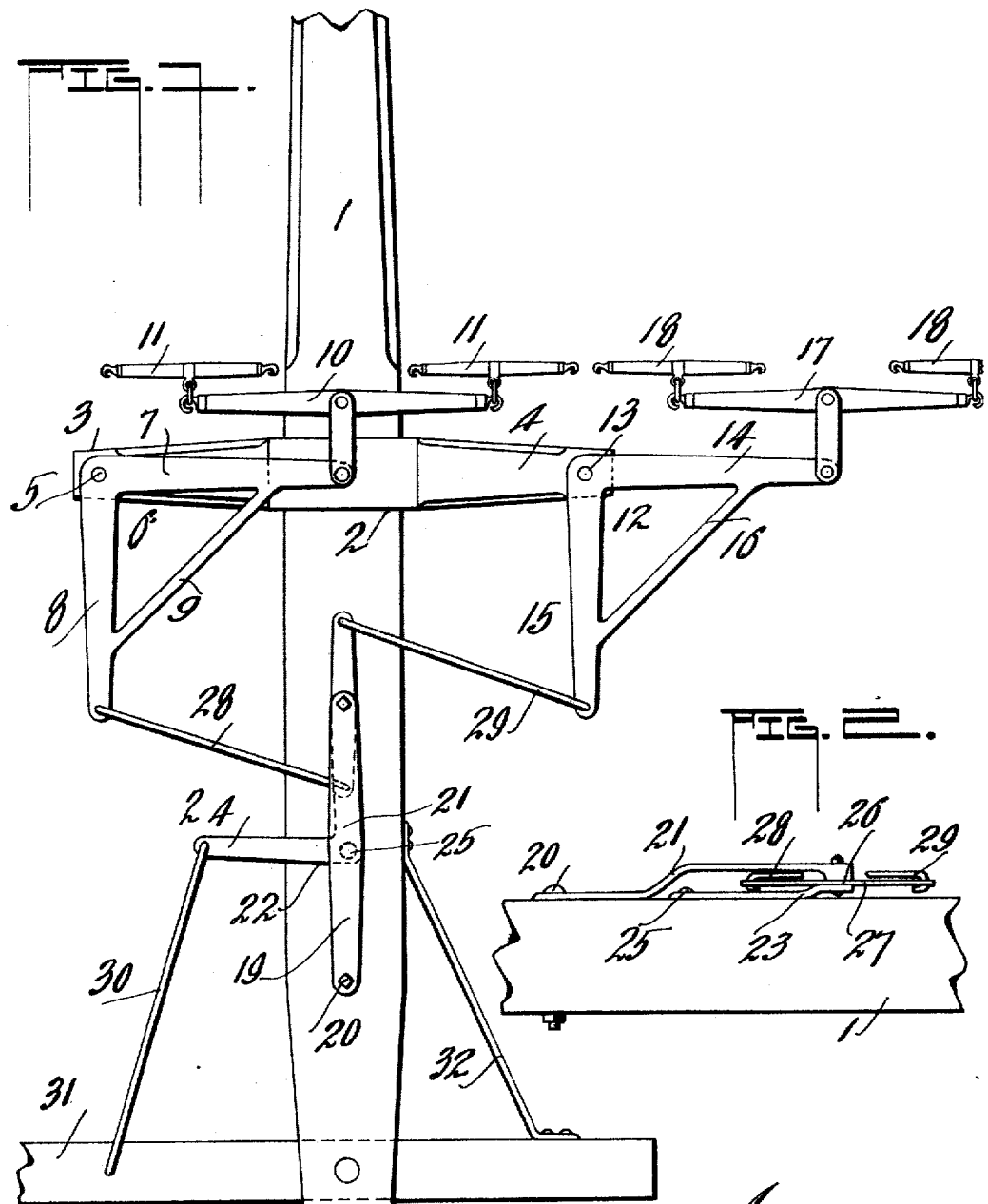

MARION ADDY, OF PEORIA, ILLINOIS, ASSIGNOR OF ONE-HALF TO GEORGE P. CHRISTENSEN, OF BARTONVILLE, ILLINOIS.

DRAFT-EQUALIZER.

No. 813,994.     Specification of Letters Patent.     Patented Feb. 27, 1906.

Application filed June 6, 1905. Serial No. 263,974.

*To all whom it may concern:*

Be it known that I, MARION ADDY, a citizen of the United States, residing at Peoria, in the county of Peoria and State of Illinois, have invented certain new and useful Improvements in Equalizers; and I do hereby declare that the following is a full, clear, and exact description of the invention, which will enable others skilled in the art to which it appertains to make and use the same.

This invention has reference to new and useful improvements in means for equalizing the draft of that character wherein bell-crank levers are utilized to which doubletrees are connected and the said bell-crank levers connected to an evener, the object being to construct a four-horse equalizer in which three horses are hitched to walk abreast on one side of the tongue and a single animal on the other side.

The device is particularly applicable to harvesters or binders to permit the single animal to travel on the side next the standing grain. However, the device may be used wherever similar circumstances or restriction of space occurs.

The invention relates more particularly to a tongue, a bar supported by the tongue, bell-crank levers pivotally attached to opposite ends of the bar, a reach or arm pivotally attached to the tongue, an evener pivotally connected to the free end of the reach, rods connected to the bell-cranks supported by the bar and their opposite ends connected with opposite ends of the evener, and a bell-crank lever pivotally attached to the tongue in the elbow of the said lever, having one end connected with the pivot of the evener and to the opposite end attached to a rod which at its opposite end is connected to the framework of a harvester or other machine.

This application is filed as a substitute for the application filed by me on the 30th day of November, 1904, bearing Serial No. 234,889, which contains substantially all of the features shown in the present application with the exception of the connections between the evener and the harvester or other mechine.

That my invention may be more fully understood reference is had to the accompanying drawings, in which—

Figure 1 illustrates in plan my improved draft-equalizer, and Fig. 2 is a side elevation in detail of parts attached to the tongue of the equalizer.

Reference being had to the drawings, 1 denotes the tongue or pole, which may be of the usual and approved construction. On the tongue is attached the bar or rest 2, which has portions 3 and 4 extending upon opposite sides of the said tongue. The bar or rest 2 may be of any suitable length and braced to the tongue in any convenient and desirable manner.

To the portion 3 of the bar 2 and at or near the outer end thereof is pivoted at 5 the bell-crank lever 6, formed of the right-angle extensions 7 and 8, the former lying normally above and parallel with the bar 2 and the free end thereof positioned above the center of the tongue, the portions 7 and 8 of the lever 6 connected by the brace bar or web 9.

To the free end of the portion 7 of the lever 6 is coupled a doubletree 10, the ends thereof extending upon opposite sides of the tongue, and to the ends of the doubletree are connected the usual swingletrees 11.

12 designates a bell-crank lever, in all respects similar to that indicated as 6, the same pivoted at 13 to the portion 4 of the bar 2, and at or near the outer end thereof the same has the right-angle extensions 14 and 15, the former extending from and lying normally in the same longitudinal direction of the bar 2, the extensions 14 and 15 connected by the brace bar or web 16. To the free end of the extension 14 of the lever 12 is coupled a doubletree 17, and to the ends of the doubletree are connected the usual swingletrees 18.

Connecting the bell-cranks 6 and 15 is an intermediate mechanism which also has connection with a frame of a harvester or other machine for the purpose of equalizing the draft between the bell-crank levers and to place the pull upon the side of the machine where the greatest draft is created. This mechanism consists of a reach 19, pivoted at 20 to the tongue at the rear of the bar 2, being bowed upwardly and forwardly at 21 to adapt the placing and operation of certain parts. These parts are a bell-crank lever 22, formed of the right-angle extensions 23 and 24, the said crank being pivoted at 25 to the tongue, and the end of the extension 23 pivotally attached at 26 to the free end of the reach 19. Also pivotally attached to the crank 22 and the end of the reach 19, where these two are pivotally attached, is an oscillating arm or evener 27, to the rear end of which is attached a rod 28, which at its opposite end is attached to the end of the extension 8 of the lever 6, and 29 denotes a rod similar to that indicated as 28, which connects the inner free end of the extension 15 of the crank 12 with the forward end of the arm or evener 27, and 30 denotes a rod, connected at its forward end to the free end of the extension 24 of the crank 22 and at its opposite end is attached at a suitable point to a frame part 31. This frame part (designated as 31) may be the forward frame or brace of a harvester to which the tongue is attached or some other machine to which it is adapted to attach an equalizer. The tongue is braced by a bar or reach 32 in the manner seen in the figure.

The function and operation of the device are readily apparent from the drawings, together with the description of the same, and, while the drawings illustrate the preferred form in which I wish to embody the device, it is obvious that various changes may be made in the detail construction and arrangement, and I do not wish to be confined to the details thereof.

Having thus fully described my invention, what I claim, and desire to secure by Letters Patent of the United States, is—

1. In an equalizer, the combination with the tongue, of a bar supported by the tongue and having portions extending upon opposite sides thereof, a bell-crank lever pivotally attached to one end of the bar with its inner end extending toward the center of the said bar, a second bell-crank lever pivoted to the opposite end of the said bar with an extension of the lever extending some distance beyond the end of the bar, doubletree connections with the said levers, an evener pivoted to the tongue at a point removed to the rear of the said bar having oppositely-extended portions disposed longitudinally of the said tongue, and connecting-rods between the extensions of the evener and the opposite levers.

2. In an equalizer, the combination with a tongue, a bar supported by and transversely of the tongue, levers pivoted to the opposite ends of the bar, doubletrees attached to the said levers, a bell-crank lever pivoted to the tongue, an evener pivoted to the bell-crank, rods connecting the evener and the levers on the bar, and connections between the said bell-crank and a frame part of a suitable machine.

3. In an equalizer, the combination with a tongue, a bar supported by and transversely of the tongue, levers pivoted to the opposite ends of the bar, doubletrees attached to the said levers, a bell-crank lever pivoted to the tongue, a reach also pivoted to the tongue, an evener pivoted to a free end of the reach also to one end of the bell-crank, connections between the levers on the bar and the evener, and a connecting-rod between the bell-crank and a machine part.

4. In an equalizer, the combination with the tongue, of a bar supported by the tongue and having portions extending upon opposite sides thereof, a bell-crank lever pivotally attached to one end of the bar with its inner end extending toward the center of the said bar, a second bell-crank lever pivoted to the opposite end of the said bar with an extension of the lever extending some distance beyond the end of the bar, doubletree connections with the said levers, a reach pivoted to the tongue, a bell-crank lever pivoted to the tongue, an evener pivoted to the reach and to one end of the bell-crank, rods connecting the evener and the bell-cranks on the bar, and connections between the bell-crank on the tongue and to the frame of a suitable machine.

5. In an equalizer, the combination with the tongue, of a bar supported by the tongue and having portions extending upon opposite sides thereof, a bell-crank lever pivotally attached to one end of the bar with its inner end extending toward the center of the said bar, a second bell-crank lever pivoted to the opposite end of the said bar with an extension of the lever extending some distance beyond the end of the bar, doubletree connections with the said levers, an evener pivotally mounted to the rear of the bar, connecting-rods between the extensions of the evener and the bell-crank levers, a member pivoted to the tongue to which the evener is pivoted and connections between the said member and a frame part of a suitable machine.

6. In an equalizer, the combination with the tongue, of a bar supported by said tongue, a pair of levers pivoted to the opposite ends of the bar, one of said levers having an extension 7 to the free end of which is attached a doubletree supporting swingletrees disposed upon opposite sides of the tongue, the right-angle extensions 8 of said lever, the second lever having the portion 14 to which is attached a doubletree supporting swingletrees, the right-angle extension 15 of said lever, an evener supported for oscillation on the tongue and longitudinally thereof, the rod 28 connecting one end of the evener with the extension 8 of the first-mentioned lever, and the rod 29 connecting the opposite end of the evener with the extension 15 of the last-mentioned lever.

In testimony whereof I affix my signature in presence of two witnesses.

MARION ADDY.

Witnesses:
  CHAS. W. LA PORTE,
  G. P. CHRISTENSEN.